United States Patent
McIntire et al.

(10) Patent No.: US 7,134,065 B2
(45) Date of Patent: Nov. 7, 2006

(54) COMMUNICATION LINK WITH COMPENSATION FOR INTERRUPTION OF SIGNAL FLOW

(75) Inventors: William McIntire, Sandy, UT (US); Dale D. Fonnesbeck, Kaysville, UT (US)

(73) Assignee: L-3 Communications Corporation, New York, NY (US)

( * ) Notice: Subject to any disclaimer, the term of this patent is extended or adjusted under 35 U.S.C. 154(b) by 526 days.

(21) Appl. No.: 10/669,234

(22) Filed: Sep. 22, 2003

(65) Prior Publication Data

US 2005/0063456 A1    Mar. 24, 2005

(51) Int. Cl.
*H03M 13/00* (2006.01)

(52) U.S. Cl. ................................. 714/762
(58) Field of Classification Search ............ 714/762, 714/788
See application file for complete search history.

(56) References Cited

U.S. PATENT DOCUMENTS 5,920,565 A * 7/1999 Cullen ................... 370/401
6,108,322 A * 8/2000 Kotzin et al. ............ 370/333
6,910,168 B1 * 6/2005 Baker et al. ............. 714/751

* cited by examiner

Primary Examiner—Shelly Chase
(74) Attorney, Agent, or Firm—Perman & Green, LLP

(57) ABSTRACT

A method and system for maintaining communication of data in a communication link between a transmission site and a reception site during a momentary disruption of the communication link includes storage of data during the disruption, and optionally both prior to and subsequent to the disruption, to enable communication subsequently to the disruption. In one embodiment, data is stored over an interval of time longer than the disruption and centered on the disruption, and is scrambled prior to communication between the transmission site and the reception site. Unscrambling of the data in a received sequence and application of error-correction code to the received sequence regains information which would have been lost in the disruption. Use may also be made of buffers at both of the sites for saving data which was to be transmitted during the disruption, and communicating the data to the end-user buffer subsequent to the disruption.

22 Claims, 6 Drawing Sheets

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 |
← 122
FIG. 4
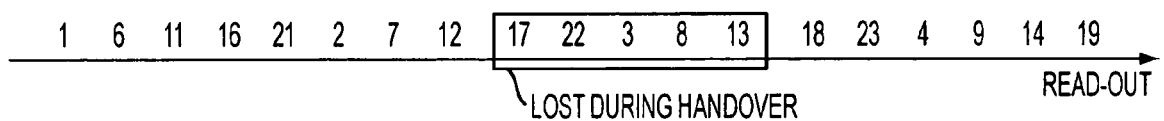
LOST DURING HANDOVER          READ-OUT
FIG. 5
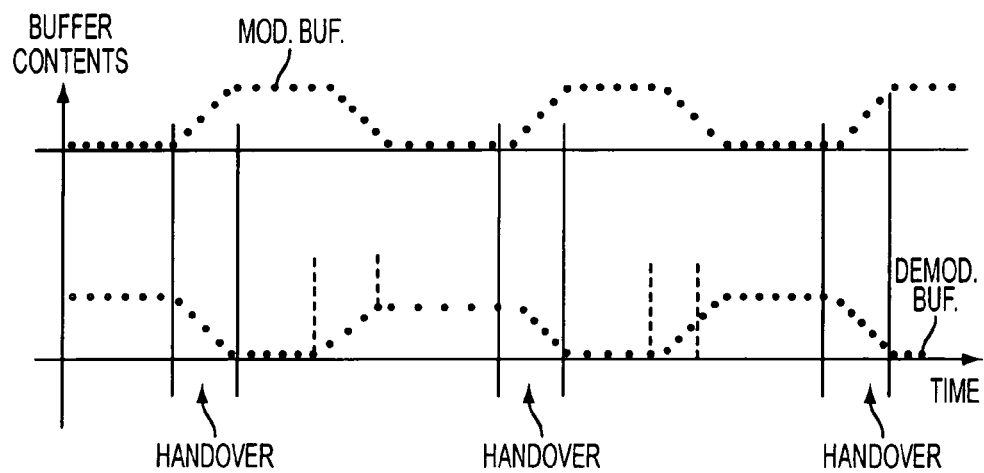
FIG. 6

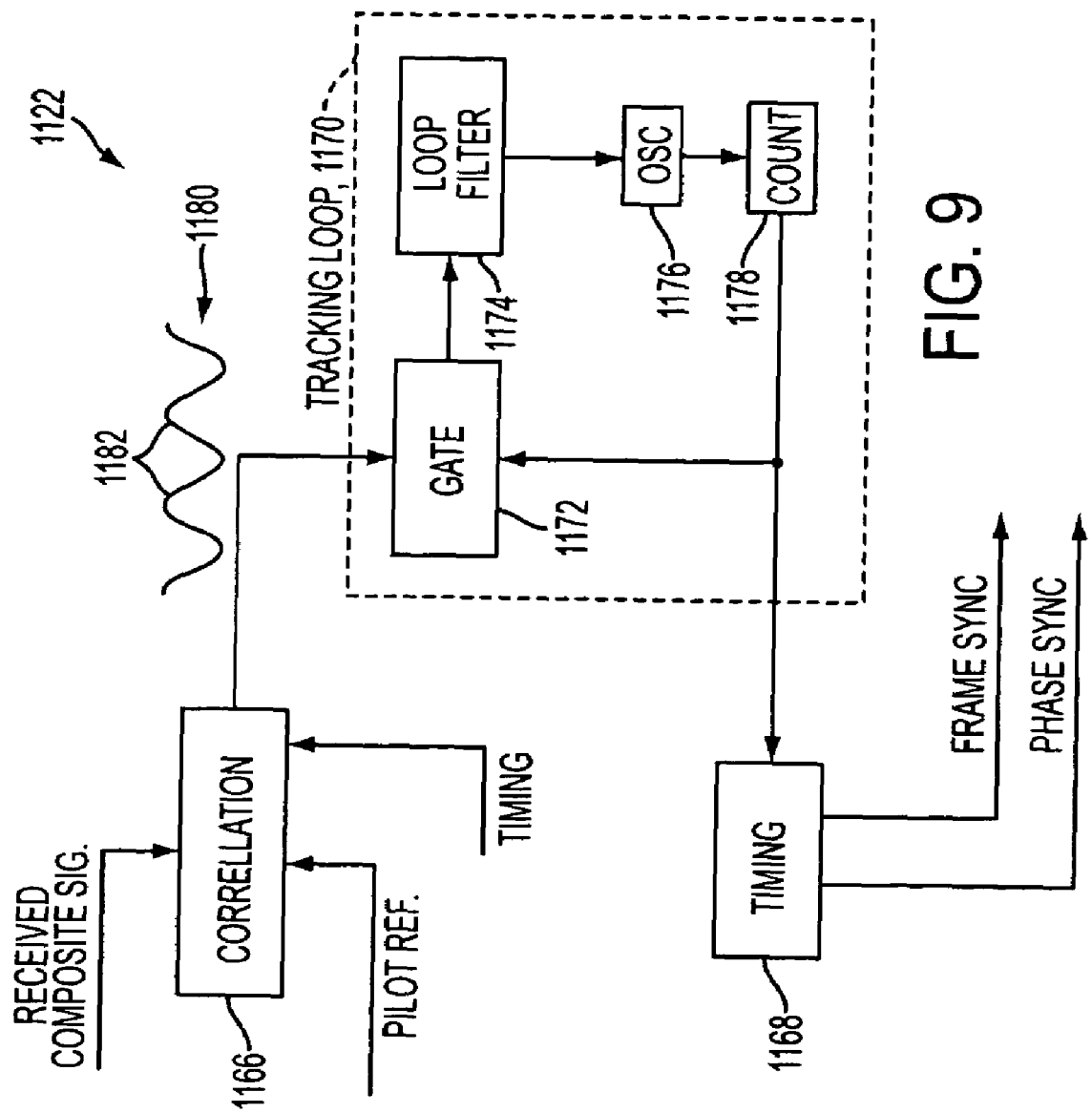

COMMUNICATION LINK WITH COMPENSATION FOR INTERRUPTION OF SIGNAL FLOW

BACKGROUND OF THE INVENTION

1. Field of the Invention

This invention relates to a communication link with two-way communication of data, and more particularly, to a compensation for interruption of data flow along the link during both long and short intervals of data interruption, thereby to reduce any resulting communication errors.

2. Brief Description of Related Developments

Communication systems are widely used in many situations including communication between persons, as in cellular telephony, and between various forms of equipment, such as between a satellite and a ground station. Various data formats and protocols have evolved to facilitate communication in differing situations. Communication may involve multiple access technologies such as CDMA (code division multiple access), TDMA (time division multiple access), FDMA (frequency division multiple access), modulation technologies such as PSK (phase shift keying), QAM (quadrature amplitude modulation), and FEC (forward error correction) such as Reed Solomon coding, convolutional encoding, and turbo coding, by way of example. Detection of such signals may require a highly accurate time base for observation of relatively small differences in phase of a carrier signal, phase of the symbol and phase of the multiplexer frame. Furthermore, the time base employed in a receiver of a signal must be the same as the time base (synchronous) employed in a transmitter of the signal in order to enable successful operation of receiving processes (demodulation operation), such as matched filtering, by way of example. In the case of a communication system employing a modem at each end of a communication link, such as a link connecting two computers for enabling communication between the two computers, it is necessary to include within each of the modems circuitry for transmitting synchronization or time-frame signals and circuitry for recognizing received synchronization or time-frame signals.

Communication systems generally provide for continuous transmission of the data between a transmitting station and a receiving station. In the design of a typical communication system, such as a communication system carrying digitized data, it is presumed that there will not be any significant interruption in the flow of data, particularly an interruption that might arise from the temporary presence of a physical object which blocks the transmission path. Such an interruption, even a relatively short interruption on the order of a few milliseconds, could cause a loss in bit-count-integrity (BCI) so that data loss would continue even after termination of the interruption until such time as the transmitted signal could be reacquired by the receiving station.

By way of example in a communication system, one may consider first and second modems communicating with each other via a communication satellite which encircles the earth. The first modem is located on a ship at sea, and the second modem is located on land. To demonstrate the problematic situation addressed by the present invention, it is presumed that certain portions of the superstructure of the ship extend higher than communication antennas of the ship so that, depending on the orientation of the ship relative to one of its communication antennas and to the communication satellite, there are times when the superstructure of the ship may block the path of propagation of electromagnetic signals from a communication antenna to the satellite. To obviate most of this problem, two communication antennas may be employed in alternative fashion, whereby communication between the ship modem and the shore modem is directed either via the first or the second of the communication antennas. Thereby, in the event that the ship turns, such that there may be blockage of one of the antennas from view of the satellite, the other of the antennas is connected to the ship modem to resume the communication. Such a solution to the problem works well in that communication is always possible. However, a portion of the problem still remains, namely, that during the switching of the antennas there is an interval of time, on the order of milliseconds, in which data may be lost. By way of example, in the case of transmission from the shore modem via the satellite to the ship modem, the interval of lost data is approximately one millisecond. On the other hand, in the case of transmission from the ship modem via the satellite to the shore modem, it may be necessary to turn off the ship's transmitter for the first antenna and then to turn on the ship's transmitter for the second antenna with a resulting lost-data interval of approximately 80 milliseconds. The foregoing situation involving the two antennas is a specific example of the more general case of an interruption interval appearing in a handover between components of a communication system, such as a mobile station being handed over between two base stations in a cellular telephony system.

SUMMARY OF THE INVENTION

The aforementioned problems are overcome and other advantages are provided by a communication system employing the features of both data buffering and interleaving of a data bit stream to maintain BCI, and to eliminate errors in order to avoid a losing of data that would otherwise result during a switching of antennas. This allows a modem to be employed with a data link having two or more antennas wherein the modem is switched between antennas without overlap in time between the antenna signal paths and without a significant path differential, while avoiding an actual dead period during the time in which the antenna switching is occurring. The methodology of the invention provides for recovery of lost data and maintains BCI even when the switching results in a path delay change that is many carrier cycles long, and several symbol times long. The advantages of the invention are available even when a significant outage period is present and wherein no signal is available. Except for a small increase in transmission delay, a user of the modem and the communication system would be unaware of the switching of antennas.

The invention relates to a situation wherein a communication is interrupted for a relatively short time, such as two milliseconds, in one direction of communication, while being interrupted for a relatively long time, such as 80 milliseconds in the opposite direction of communication. A specific situation dealt with by the invention involves a communication with a ship via satellite wherein the ship has two antennas for viewing the satellite from different directions and wherein the transmitter is turned off before switching between antennas at a handover. Thus, in the event that the ship is receiving a signal, possibly from a station on shore via the satellite, and a handover occurs, the handover can the accomplished rapidly because there is no interruption between connection of receiver to antenna other than by operation of an interconnecting switch. But when the ship is transmitting a signal, possibly to the station on shore via the satellite, a relatively long time interval elapses during handover between the antennas as the transmitter is turned off and reactivated to allow for a switching of antennas while power is off, and avoidance of antenna switching while power is on. An interleaving feature of the invention is provided for handling the short time handover interval while a store and playback feature of the invention is provided for handling the long time handover interval.

The interleaving feature is demonstrated for the situation wherein a modem on the shore is transmitting a signal via satellite to a modem on the ship. If the ship turns during the transmission, such that is becomes necessary to implement a handover between antennas to avoid blockage of the satellite transmission path by the superstructure of the ship, the receiving channel of the modem remains activated during a switching of the modem between the antennas in the handover. The shore modem has no advance knowledge of the handover, and continues to transmit data during the handover. Data and also synchronization signals transmitted during the handover fail to be received by the ship modem. In the absence of the invention, the data would be lost, but synchronization signals would be reacquired by the ship modem after the handover. In the practice of the invention, is preferable to use a form of synchronization signal which is readily acquired so as to minimize the system drop-out time when no data is being communicated. The invention prevents loss of the data by employing memories in both of the modems, which memories serve as interleavers wherein the interleaver of the ship modem operates in inverse fashion to the memory of the shore modem.

By way of example in the operation of the shore-modem interleaver, the memory may be regarded as a table of rows and columns wherein data from an input sequence of data bits is read in row by row, and then read out column by column to produce an output sequence of the data bits. Bits of data which were closely positioned in the input sequence are spread apart in the output sequence. The time durations of the input and the output sequences greatly exceed the handover interval, by way of example, by a factor of 20. Thus, a cluster of original data bits are spread apart in time so that only a small fraction of the cluster of data bits are lost in the handover. Upon receipt of the output sequence of the shore-modem interleaver by the ship-modem interleaver, the ship-modem interleaver operates in the inverse fashion to regenerate the data-bit sequence originally presented to the shore-modem interleaver. In the present example of the 20:1 ratio between sequence duration and handover duration, only 5% of the data bits are lost so that the data represented by the cluster of data bits can be regained by error-correction circuitry following the interleaver of the ship modem.

The store and playback feature is demonstrated for the situation wherein the modem on the shore is receiving a signal via satellite from the modem on the ship. If the ship turns during the transmission, such that is becomes necessary to implement a handover between antennas to avoid blockage of the satellite transmission path by the superstructure of the ship, the transmitting channel of the ship modem is deactivated during a switching of the modem between the antennas in the handover. The shore modem has no advance knowledge of the handover, and attempts to receive data during the handover, even though there is no data or synchronization signals being transmitted from the ship during the handover. However, the ship provides a handover signal which is employed to deactivate the transmission channel of the ship modem prior to and during the handover. This protects the high-power transmission stages of the ship modem during the switching between the antennas.

The invention provides for a continuous flow of data into the demodulation section of the shore modem and during the occurrence of the handover by use of memories located in both the modulation section of the ship modem and in the demodulation section of the shore modem to act as data buffers. During regular transmission of data from the ship modem to the shore modem, prior to the handover, there is an interval of time during which the data is transmitted at a slightly higher rate (higher by approximately 1%, by way of example) that results in a filling of the buffer at the shore modem. Subsequently, during the handover, data continues to be fed out of the buffer into the demodulation circuitry of the shore modem. At the conclusion of the handover, the flow of data resumes via the satellite so that the demodulation section of the shore modem continues to process received data, such that a user of the data received at the shore modem is unaware that the handover has occurred. The buffer in the modulation section of the ship modem is employed for the reloading of the buffer of the shore modem. This is accomplished by use of the handover signal to direct the buffer to continue receiving ship-side data during the handover, even though the transmission equipment is deactivated, whereby the buffer is filled with data to enable a subsequent refilling of the buffer of the shore modem.

It is noted also that, while the invention is intended to maintain communication of data during a disruption of a data communication link in the case of a handover, the methodology of the invention can be employed even in the case of disruption due to a cause other than a handover.

BRIEF DESCRIPTION OF THE DRAWING

The aforementioned aspects and other features of the invention are explained in the following description, taken in connection with the accompanying drawing figures wherein:

FIG. 4 is a diagram of an interleaver memory showing a writing-in of data;

FIG. 5 shows a read-out sequence of data from the interleaver of FIG. 4;

FIG. 6 is a timing diagram showing the contents of buffer memories of the system of FIG. 1;

FIG. 9 shows circuitry for detection of pilot symbols in the demodulation section of FIG. 8.

DETAILED DESCRIPTION OF THE PREFERRED EMBODIMENT(S)

Figure 1:
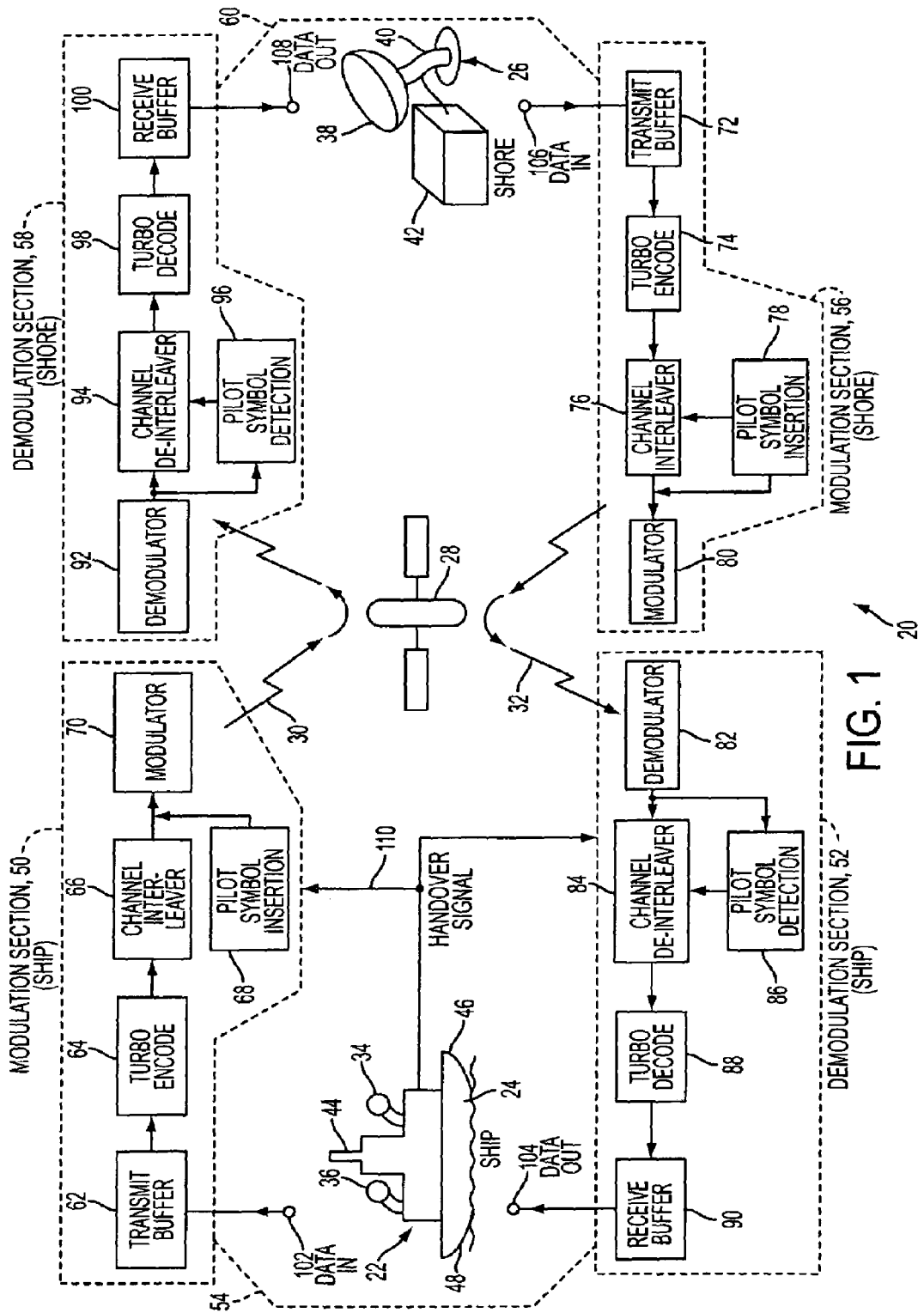
FIG. 1 shows a diagrammatic view of a communication system constructed in accordance with the invention.

FIG. 1 shows a diagrammatic representation of a communication system 20 having two-way communication between a station 22 on board a ship 24 and a station 26 on the shore, wherein the communication is via a satellite 28. The system 20 is presented by way of example for demonstrating a situation in which a path 30, 32 of propagation of a communicated signal may be momentarily interrupted, as by a handover between two antennas 34, 36 such as the two antennas 34, 36 forming a part of the ship station 22. The shore station 26 is provided with a single antenna 38 connected via a cable 40 to electronic equipment 42. It is to be understood that the teachings of the invention apply also to other situations wherein a path of communication may be interrupted momentarily.

For purposes of demonstrating a situation in which a path of communication is interrupted, the ship 24 is shown with a superstructure 44 that extends above each of the two antennas 34, 36 wherein one of the antennas 34 is forward of the superstructure 44 and the second of the antennas 36 is aft of the superstructure. In the event that the ship 22 is oriented with a side of the ship facing the satellite 28, then communication by either one of the two antennas 34, 36 with the satellite 28 is possible. However, in the event that the bow 46 of the ship is facing the satellite 28, then the forward antenna 34 can view the satellite 28 while the aft antenna 36 is blocked from view of the satellite 28 by the superstructure 44. Also, in the event that the stern 48 of the ship 24 is facing the satellite 28, then the aft antenna 36 can view the satellite 28 while the forward antenna 34 is blocked from view of the satellite 28 by the superstructure 44.

FIG. 1 also shows electronic circuitry contained within the ship station 22 and the shore station 26. The ship station 22 includes a modulation section 50 and a demodulation section 52 which constitute a modem 54, and the shore station 26 also includes a modulation section 56 and a demodulation section 58 which constitute a further modem 60. The components of each of the modems 54, 60 are shown in simplified fashion in FIG. 1, with further details to be provided in subsequent ones of the figures. The ship modulation section 50 comprises a transmit buffer 62, a turbo encoder 64, a channel interleaver 66, pilot-symbol insertion circuitry 68, and a modulator 70. The shore modulation section 56 similarly comprises a transmit buffer 72, a turbo encoder 74, a channel interleaver 76, pilot-symbol insertion circuitry 78, and a modulator 80. The ship demodulation section 52 comprises a demodulator 82, a channel de-interleaver 84, pilot-symbol detection circuitry 86, a turbo decoder 88, and a receive buffer 90. The shore demodulation section 58 similarly comprises a demodulator 92, a channel de-interleaver 94, pilot-symbol detection circuitry 96, a turbo decoder 98, and a receive buffer 100. It is to be understood that both of the modulators 50, 80 and both of the demodulators 82, 92 include RF (radio frequency) circuitry for communicating with the satellite 28. Data to be transmitted by the ship station 22 is input via terminal 102 to the transmit buffer 62 while data to be received by the ship station 22 is output at terminal 104 from the receive buffer 90. Similarly, data to be transmitted by the shore station 26 is input via terminal 106 to the transmit buffer 72 while data to be received by the shore station 26 is output at terminal 108 from the receive buffer 100.

The modulation circuitry and the encoding circuitry may provide for one or more signaling formats such as, by way of example, CDMA, TDMA, PSK, QAM, Reed Solomon coding, convolutional encoding and Turbo coding. More specifically, such circuitry provides data processing or formatting for error correction and phase ambiguity resolution for multiuser (TDMA, FDMA and CDMA), spread spectrum by direct sequence (DS) or frequency hopped (FH), and modulation/signaling (PSK, QAM, MSK), by way of example.

Figure 2:
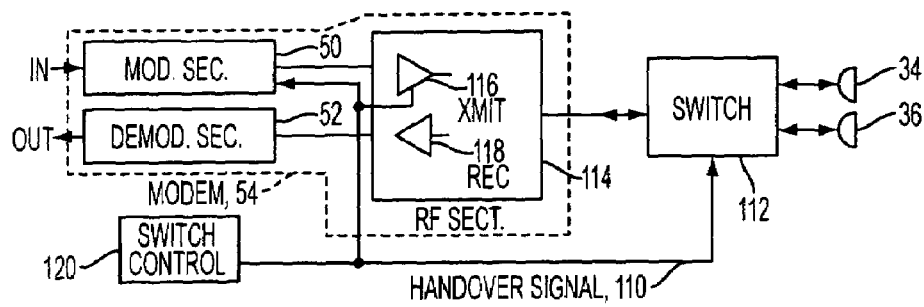
FIG. 2 shows a block diagram of a handover function provided in the system of FIG. 1.

Also shown in FIG. 1 is a handover signal 110 provided by the ship 24 to the ship modulation section 50 to facilitate a handover process when it becomes necessary to hand over communication from one to the other of the antennas 34, 36 due to a turning movement of the ship 24, which would cause blockage of an antenna 24, 36 by the ship's superstructure 44. FIG. 2 shows further details in the implementation of the handover signal 110. The two antennas 34, 36 are connected via a switch 112 to circuitry of an RF section 114 of the ship modem 54. To simplify the drawing, only a high-powered transmitter amplifier 116 for amplifying a signal outputted by the modulation section 50, and a receiver amplifier 118 for applying a received signal to the demodulation section 52 are shown in the RF section 114, the construction of such circuitry being well known. A switch control unit 120, on the ship 24, determines when the propagation path between any one of the antennas 34, 36 and the satellite 28 is getting close to blockage by the superstructure 44, due to the orientation and anticipated heading of the ship 24. When blockage appears likely, the switch control unit 120 outputs the handover signal 110 to operate the switch 112 to connect the RF section 114 to the alternate one the antenna 34, 36. Thereby, blockage of satellite communication is avoided.

However, there is a momentary interruption during the handover process, as communication is handed over from one to the other of the antennas 34, 36. By way of example, the transmission path length is altered upon a switching of the antennas 34, 36. Thus, for a signal being received by the ship modem 54, resynchronization with carrier phase, symbol timing, and/or blocks of the formatted signal becomes necessary. The handover process in the case of a signal being received at the ship 24 results in a signal drop-out interval of time of approximately 1–2 milliseconds by way of example. However, in the case of a signal being transmitted by the ship modem 54, it is preferable to avoid operation of the switch 112 during the presence of high-powered signal transmission between the RF section 114 and one of the antennas 34, 36. Accordingly, in the preferred embodiment of the invention, the handover signal 110 is employed also to deactivate the transmitter amplifier 116, and to terminate a flow of data through the modulation section 50 during the handover interval. The deactivation and reactivation of the transmitter amplifier 116 introduces a signal drop-out interval of many milliseconds duration such as, by way of example, 80 milliseconds duration. The invention provides for two separate procedures, to be described in further detail hereinafter, to compensates for the relatively short handover interval for signals incoming to the ship 24 from the satellite 28, and to compensate for the relatively long handover interval for signals outgoing from the ship 24 to the satellite 28.

The signal drop-out interval, for both the case of the ship's incoming signal and for the case of the ship's outgoing signal, can be reduced by introduction of a synchronization signal, in the form of a sequence of pilot symbols, into the transmitted data stream. This is accomplished by momentarily terminating the flow of data symbols, and inserting the sequence of pilot symbols, and then resuming the flow of the data symbols. This is accomplished periodically as a shown in FIG. 3. Due to the presence of the sequence of pilot symbols inserted into the stream of the data symbols, there is a slight reduction in the total amount of data communicated per second, but there is a significant reduction in the time required for acquisition of the data symbols upon the occurrence of a handover between the two antennas 34, 36.

Figure 3:
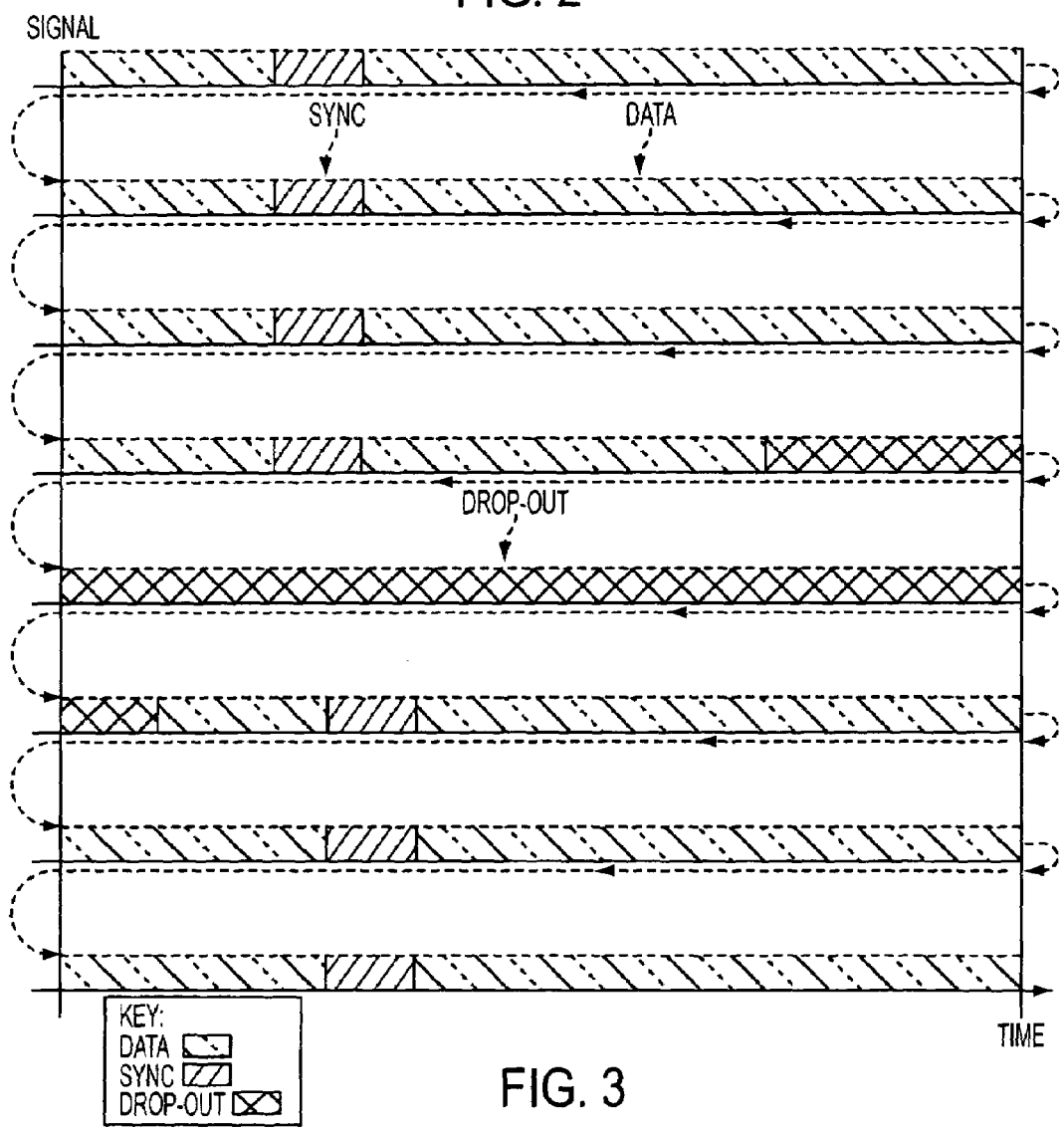
FIG. 3 is a timing diagram showing data, synchronization, and drop-out time for the operation of the system of FIG. 1.

The timing diagram of FIG. 3 portrays the transmission of a signal from shore to ship wherein, during a handover, there is a drop-out time presumed, by way of example, to have a duration of one millisecond. Compensation for this drop-out time is provided by use of the interleaver 66, 76 (FIG. 1) as will be described hereinafter, wherein, even though there is a loss of data symbols between the time of drop-out and the time of reacquisition of the synchronization signal, the interleaver 66, 76 provides for a distribution of errors which enables the decoder of the ship demodulation section 52 to make corrections. Accordingly, there is effectively no significant loss of data in the shore-to-ship communication.

In the diagram of FIG. 3, the time coordinate, which extends horizontally from left to right, is folded so as to facilitate a showing of multiple periods of the synchronization signal. The folding is selected such that one line of the diagram represents one period of the synchronization signal spacing. Thus, in the first four rows, successive occurrences of the synchronization signal are in registration, and appear in a column. During the latter part of the fourth row, a handover begins, and there is loss or drop-out of the signal being received at the ship. To facilitate a portrayal of the synchronization interval, the data interval, and the drop-out interval, the synchronization interval is indicated by straight-line hatching, the data interval is indicated by curved-line hatching, and the drop-out interval is indicated by an X-hatching.

The drop-out interval continues throughout the handover, which includes the switching of the antennas 34, 36 followed by reacquisition of the data signal. Resumption of the data flow is shown in the sixth row of the diagram. Successive ones of the handover intervals may differ with respect to the change in the distance of the satellite 28 from one of the antennas 34 or 36 to the other of the antennas 36 or 34. Thus, normally, upon resumption of the flow of data and the synchronization signals, the columnar representation of the successive synchronization signals, as portrayed in the bottom three rows of the diagram, is not in alignment with the columnar representation of the synchronization signals in the first four rows of the diagram.

FIGS. 4 and 5 show operation of the channel interleaver 76 of the shore modulation section 56 of FIG. 1, the explanation of this operation applying also to the channel interleaver 66 of the ship modulation section 50. FIG. 4 represents a memory 122 of the interleaver 76 wherein a succession of data symbols, applied to the interleaver, are stored in successive cells of the first row of the memory 122, wherein the data symbols are written into the first row of FIG. 4 from left to right. The successive data symbols are numbered in FIG. 4. By way of example, FIG. 4 shows five rows, each of which has five cells, it being understood that many more cells per row and many more rows would be used in practice. After completion of the first row, the writing of the data continues into the second row, again from left to right, and thereafter proceeds into the further rows of the memory 122.

A reading out of the data from the interleaver memory 122 is accomplished on a column by column basis, wherein the data symbols are read out from top to bottom from the left column, and upon completion of the readout from the left column, the readout continues with the second column from the left, and then with further columns until all of the data symbols have been readout of the memory 122. FIG. 5 shows a portion of the sequence of the symbols as readout from the memory 122 of FIG. 4 on the column-by-column basis. In particular, it is noted that, during the writing of the data in the memory of FIG. 4, the locations of data symbols relative to each other in a sequence of the symbols is retained. For example, the symbols numbered 7, 8 and 9 are shown side-by-side in FIG. 4. However, in the read-out sequence of FIG. 5, the same symbols numbered 7, 8 and 9 and dispersed widely. It is the sequence of symbols of FIG. 5 that is actually transmitted via the satellite 28. In the event of the occurrence of a handover, the symbols (data and/or pilot) in a subsequence of the sequence of FIG. 5 are lost. Such a subsequence of lost symbols is identified in FIG. 5. By way of example, only five symbols are shown lost for purposes of explaining the invention, it being understood that in practice, a subsequence of lost symbols would have many more symbols.

In the subsequence of lost symbols, each of the symbols is isolated from its nearest neighbors of the original sequence applied to the interleaver. For example, with respect to the above noted symbols numbered 7, 8 and 9, only the symbol numbered 8 appears among the lost symbols. The nearest neighbors to the symbol numbered 8 in the subsequence of lost symbols are numbered 3 and 13, which are far removed from the symbol numbered 8 in the original sequence. Assuming that a set of neighboring symbols of the original sequence describes a piece of data, then the loss of only one of these symbols, such as the symbol numbered 8, destroys only a fraction of the data. In the example portrayed in FIGS. 4 and 5, the lost set of symbols is shown as one-fifth of the total number of symbols stored in the interleaver memory. However, in practice, the size of the interleaver memory is selected that the set of lost symbols is no more than approximately 5% of the total number of symbols stored in the interleaver memory. Thereby, only a small fraction of a piece of data is lost, which loss can be corrected by the error encoding and decoding circuitry of the modulation sections 50, 56 and the demodulation sections 52, 58 of FIG. 1.

The de-interleaver 84 of the ship demodulation section 52, as well as the de-interleaver 94 of the shore demodulation section 58, comprises a memory, such as that portrayed in FIG. 4, but wherein the sequence of data symbols applied to the memory is written in by columns, and read out by rows. This write-read sequence is the reverse of the foregoing operation of the interleaver 66, 76 and provides the result that the dispersed arrangement of the sequence of FIG. 5 is converted back to the original sequence, except for some blank spaces wherein data symbols have been lost due to a handover. The regeneration of the original sequence of transmitted symbols enables the decoder of the ship demodulation section 52, as well as the decoder of the shore demodulation section 58, to recover the data successfully even though a relatively small fraction of data symbols may have been lost in a handover, or may have been lost due to some other cause such as an atmospheric disturbance.

With reference to FIGS. 1 and 6, the transmit buffers 62 and 72 at the input portions of the modulation sections 50 and 56, and the receive buffers 90 and 100 at the output portions of the demodulation sections 52 and 58 may be used to facilitate an interface of data flow into and out of each of the modems 54 and 60, respectively. However, in accordance with a feature of the invention, by expanding the size of the transmit buffer 62 of the ship modulation section 50 and the receive buffer 100 of the shore demodulation section 58, these buffers 62 and 100 can be employed to provide for a smooth flow of data from the ship station 22 to the shore station 26 even in the situation wherein the ship transmitter amplifier 116 (FIG. 2) has been deactivated during a handover between the two antennas 34 and 36. This is accomplished by initially filling the shore receive buffer 100 with data and synchronization signals before the occurrence of a handover, and by emptying ship transmit buffer 62 prior to the occurrence of the handover. Then, during the handover, when no signals are being received at the shore station 26 from the satellite 28, data and synchronization signals are read out of the shore receive buffer 100 for use at the shore station 26 as though there had been no interruption in the flow of transmitted data from the ship 24. Also, during the handover, data at the ship station 22 continues to be inputted to the previously-emptied transmit buffer 62, so that the ship station 22 is able to operate as though there had been no interruption in the flow of transmitted data from the ship 24.

The foregoing procedure in the use of the buffers is described in FIG. 6. The upper graph shows a filling of the transmit buffer 62 of the ship modulation section 50 as a function of time, represented on the horizontal axis. The lower graph shows a filling of the receive buffer 100 of the shore demodulation section 58 as a function of time. With respect to the upper graph, prior to a handover, the transmit buffer 62 is empty or mostly empty and, during the handover, is being filled with data from the ship station 22. The level of filling of the transmit buffer 62 is gradually reduced during an interval of time subsequent to the handover, such as by use of a slightly increased data transmission rate provided by the ship modulator section 50. Thereby, the transmit buffer 62 is emptied in preparation for the next handover. In contrast, the receive buffer 100 is full prior to the occurrence of the handover, and is emptied during the handover. Thereafter, at a time subsequent to the handover, the receive buffer 100 is gradually filled, in consequence to the aforementioned gradual increase in the data rate, so as to be full in preparation for the next handover.

The operation of the communication system 20 of FIG. 1 can now be described generally, with specific details in the operation of some of the components being described hereinafter. In the ship modulation section 50, the transmit buffer 62 receives data from the input terminal 102, and applies the data to the turbo encoder 64. The turbo encoder 64 is provided as an example of forward error correction coding, and other forms of well-known coding such as Reed-Solomon coding may be employed. The encoded data is applied by the encoder 64 to the interleaver 66 which provides for an interleaved sequence of the data. The interleaved sequence of the data is then multiplexed with pilot symbols of the symbol insertion circuitry 68 and modulated by the modulator 70 onto a carrier for transmission on the uplink to the satellite 28. On the down-link, the satellite 28 transmits a signal to the shore demodulation section 58 wherein the modulator 92 demodulates the carrier to restore the signal to baseband. The sequence of pilot symbols is detected by the detection circuitry 96 and used to establish a time base for processing the received signal, such as operation of the de-interleaver 94. The sequence of receive data symbols is converted by the de-interleaver 94 back to the original sequence of data symbols, and is then applied to the turbo decoder 98 to recover the original data. The original data, as decoded by the decoder 98, is stored in the receive buffer 100 to be outputted at the output terminal 108 for use at the shore station 26.

The foregoing description of the operation of the ship modulation section 50 and the shore demodulation section 58 for signals propagating via the transmit path 30 and the satellite 28 applies also to the operation of the shore modulation section 56 and the ship demodulation section 52 for signals propagating via the receive path 32 and the satellite 28. The shore modulation section 56 comprises components corresponding to those of the ship modulation section 50, and operates in a fashion analogous to that described for the ship modulation section 50. The ship demodulation section 52 comprises components corresponding to those of the shore demodulation section 58, and operates in a fashion analogous to that described for the shore demodulation section 58.

In view of the foregoing operation of the communication system 20, the novel features of the invention can be explained in terms of the foregoing operation. The antenna handover compensation is designed to minimize delay through the communication link, both the ship-to-shore link and the shore-to-ship link, while providing a user with a seamless handover. Thus, the user of the data link will not notice when a handover occurs. Since there is a significant dropout period during a handover, the use of additional delay by the communication system enables the data loss during the dropout to be restored. Prior to initiating a handover procedure, with the switching of antennas 34, 36 on the ship 24, the handover signal 110 is applied to the ship modem 54 to initiate additional signal processing in the ship modem 54, which signal processing compensates for the disruption in the communication between the ship modem 54 and the shore modem 60. Since an equivalent signal, indicating the initiation of the handover procedure, is not available to the shore modem 60, the transmit and receive buffers 62 and 100 are employed on the ship-to-shore link while the interleaving procedure is employed on the shore-to-ship link.

For a communication from the shore to the ship, the modulation section 56 of the shore modem 60 operates with pilot synchronization symbols enabled and inserted into the symbol stream by the insertion circuitry 78, this being usable with error correction coding such as the Turbo coding of the encoder 74. The pilot symbols serve to mark the interleaving blocks, the Turbo-code blocks, and additionally contain information necessary for the demodulation section 52 of the ship modem 54 to identify quickly the phase ambiguity, carrier phase, symbol timing, and block boundary.

Upon initiation of the handover in the shore-to-ship link, the link experiences a dropout for approximately one millisecond in the preferred embodiment of the invention, it being understood that this dropout time is provided by way of example and that a longer or shorter dropout time may be employed in practice. At a data rate of 8 Mbps (million bits per second), this would amount to 8000 bits of data lost and 1 to 2 Turbo-code blocks being disrupted depending on the block size and the time of the dropout relative to the pilot symbols.

On the ship, the demodulation section 52 of the modem 54 has received the handover event indication (handover signal 110) from the shipboard terminal and begins searching for the pilot symbols over a wider window of time. The pilot symbols will reappear within a window that is +/−305 ns (nanoseconds) (equivalent to +/−300 feet of free-space propagation delay) wide, by way of example, centered on the time of the last-found pilot symbol. When the pilot symbol is located, the demodulation section 52 extracts the carrier phase, symbol timing, and block timing and uses the up-dated time reference to process symbols that have arrived after the handover event.

At all times, the demodulation section 52 is de-interleaving the user symbols before providing them to the decoder 88. Upon the occurrence of the handover, in the absence of the invention, there would be a loss of data equal to 8000 bits plus additional data loss during the time taken to find, or to acquire, the pilot symbols. By way of example, it may be assumed as the worst case, that there is a 2 millisecond interval of lost transmission time equivalent to a loss of 16,000 bits of user data.

To continue with the foregoing example, let the interleaver depth correspond to then umber of symbols equivalent to 16,000*20 user bits, which gives an interleaver depth of 40 milliseconds. The de-interleaver 84 will spread out the lost bits with a 20 to 1 ratio (this corresponding to the erroneous bit every 20$^{th}$ bit at the output of the de-interleaver). With respect to the lost bits, on average, half of these bits may be correct and half may be erroneous. As a result, there is a 2.5% error rate at the input to the Turbo-decoder 88, which is within the ability of the decoder 88 to correct and to deliver to the user s data which is free of error caused by the handover process.

The cost of the error correction, in terms of system performance, is the additional propagation delay to a data signal communicated by the communication system 20, which additional delay is found in the signal processing of the interleaver 76 of the modulation section 56 of the shore modem 60 and in the signal processing of the de-interleaver 84 of the demodulation section 52 of the ship modem 54. As noted in the foregoing example, the time elapsed from the reading of a bit of data into the interleaver to the outputting of the bit of data from the interleaver is 40 milliseconds, and there is a corresponding amount of elapsed time for the passage of the bit of data through the de-interleaver, to give a total additional signal propagation delay of 80 milliseconds.

For a communication from the ship to the shore, the modulation section 50 of the ship modem 54 has the benefit of the ship's handover signal 110 indicating the initiation of the handover procedure. During the processing of transmitted and received signals during a handover mode by both the ship modem 54 and the shore modem 60, the respective data buffers of the modems store the amount of data traveling along the communication link within a time interval of specified length. For uniformity in the handover characteristics of the communication system in either direction, one may choose to employ a time interval of approximately 80 milliseconds for the data buffers in the ship-to-shore direction, this time interval corresponding with the aforementioned delay of 80 milliseconds in the operation of the interleavers in the shore-to-ship direction. Such a data buffer (the aforementioned transmit buffer 62) is found, in the ship-to-shore communication link, located in the modulation section 50 of the ship modem 54 and also (the aforementioned receive buffer 100) in the demodulation section 58 of the shore modem 60.

It is noted also, as a convenience in the manufacture of these modems, that the function of the buffer of the demodulation section may be implemented by use of an existing Doppler buffer which is part of a standard modem. Also, in order that the modems may be interchangeable between ship and shore operations, both the modulation and demodulation sections of a modem may be provided with the buffer and the interleaving circuitry to be used as required for ship or shore operation.

In accordance with a feature of the invention, the handover signal 110 enables the modem 54 to control the buffers for minimal delay. When the handover event is signaled to the modulation section 50 of the ship modem 54, the modulation section 50 ceases transmission of user data at a block boundary of the error correction code, such as the Turbo code. The block boundary is marked by the pilot symbols. The demodulation section 58 of the shore modem 60 continuously monitors the communicated signal for the presence of the pilot symbols, which occur at the end of a valid block. The decoder 98 of the shore modem 60 does not receive data from the demodulator 92 unless the pilot symbols appear.

During the foregoing 80-millisecond dropout, the pilot symbols are absent and the decoder 98 of the shore modem 60 does not output any data. The shore-side user continues to receive data from the demodulator buffer 100, and consequently is unaware of the dropout. The modulation section 50 of the ship modem 54 does not transmit during the dropout, but the modulator buffer 62 begins filling with ship-side user data, and continues to fill for the 80-millisecond interval.

Upon conclusion of the 80-millisecond interval, the modulation section 50 of the ship modem 54 begins transmitting the next Turbo-encoded block of data, and inserts a set of pilot symbols at the beginning of the block. As this point in time, the demodulation section 58 of the shore modem 60 has been searching for the missing pilot symbols. It searches within the expanded window of +/−350 ns and locates the leading pilot symbols which are then employed for determining carrier phase, symbol timing, and the block boundary. By using the updated time reference provided by the reappearance of the pilot symbols, the demodulator 92 begins providing the next block of data to the decoder 98 in the shore modem 60, whereupon the decoded user data is placed in the user data buffer 100.

To this point, the user has been unaware of the handover, but the contents of the buffers 62, 100 have now shifted. The ship modulator buffer 62 has 80 milliseconds of data, and the shore modulator buffer 100 is empty. In order to successfully complete the next handover, the buffers must be returned to steady-state operation with 80 milliseconds of data stored in the demodulator buffer 100, as has been described above with reference to FIG. 6.

To return the buffers to steady-state operation, the modems may be provided with a rate throughput adaptation capability, which allows the data rate to be changed while keeping the symbol rate constant. This may be accomplished by introducing a higher code rate, which would result in a higher data rate output of the ship modulator buffer 62 into the shore demodulator buffer 100, as has been described above. Upon return of the buffers to the steady-state, the modems would return to the original code rate. Users of the modems would not observe a change in the data rate because the buffers would absorb the data transmitted at the higher rate. As an alternative approach for obtaining the buffer steady-state, the symbol rate of the ship modulator may be increased slightly (one percent by way of example) while the data rate outputted to the user at the shore modem remains constant. The demodulation section 58 of the shore modem tracks the incoming symbol rate and follows the increased symbol rate to process the symbols at the higher rate, this resulting in a filling of the demodulator buffer 100. Since only 80 milliseconds of data need to be moved, this alternative approach would return the buffer to the steady-state in eight seconds. After the eight seconds has elapsed, the symbol rate would return to normal and the steady-state is attained.

With either approach to resumption of the steady-state operation of the buffers, the user would see no interruption of data and no change in data rate. However, such use of the buffers introduces an additional 80 milliseconds of delay to the signal propagation time over the communication link from the user of the ship modem to the user of the shore modem. The foregoing usage of the buffers provides for no significant increase in the bit error rate (BER) during the handover because the system ceases to transmit data.

Figure 7:
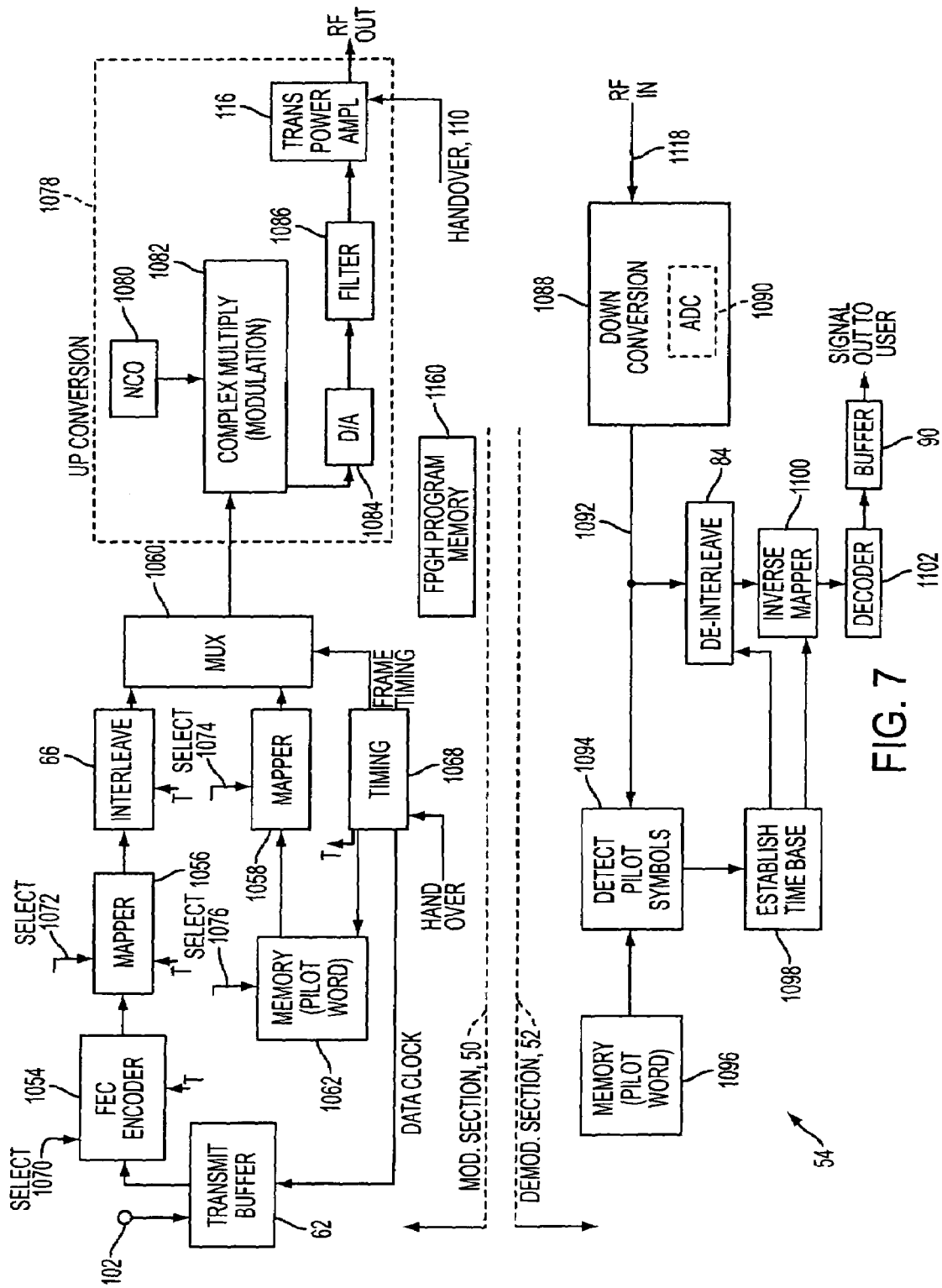
FIG. 7 is a block diagram of modulator and demodulator sections of the ship-borne modem in the system of FIG. 1.
Figure 8:
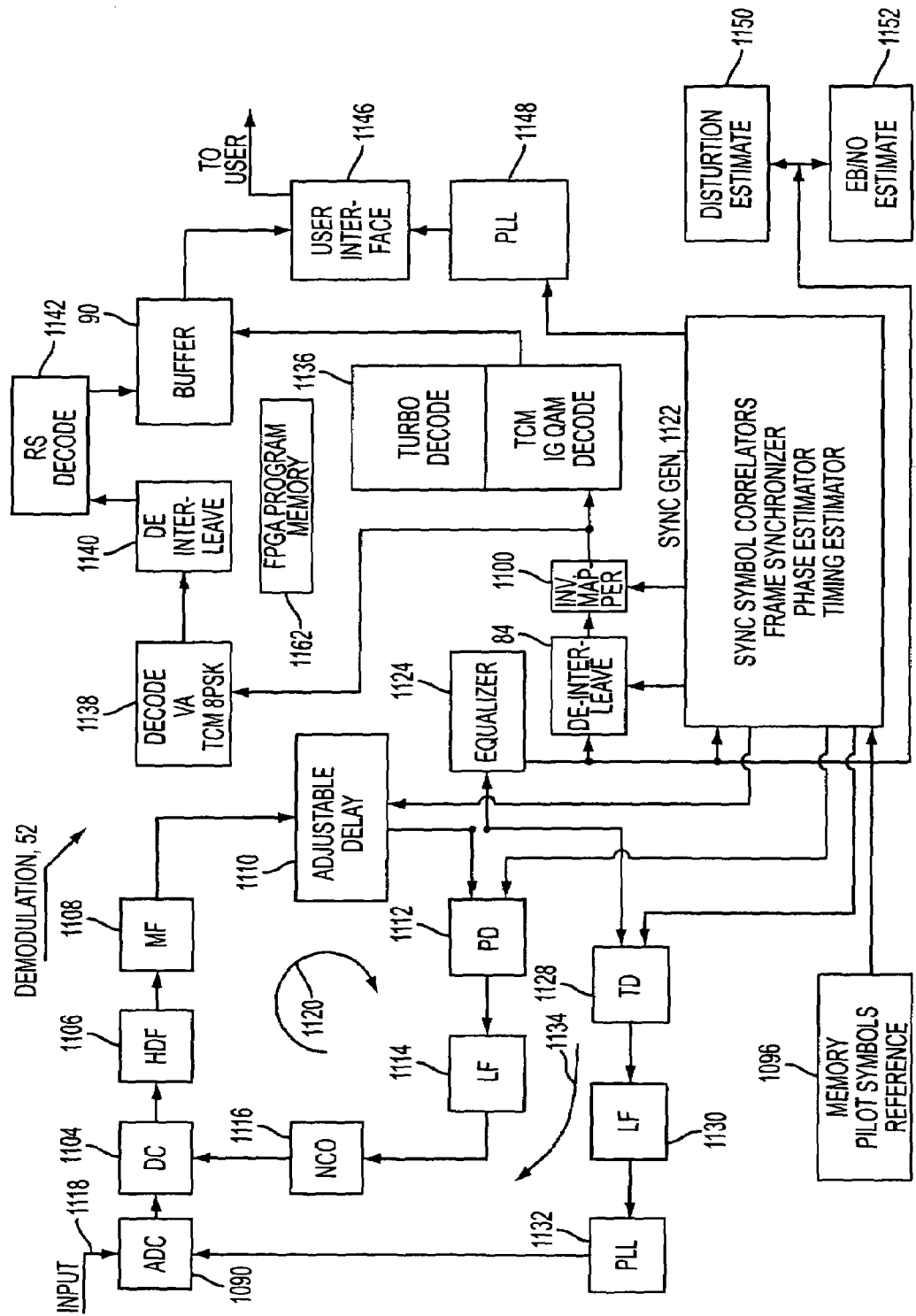
FIG. 8 is a block diagram showing details in the construction of the demodulation section of FIG. 7.

FIGS. 7, 8 and 9 provide further detail in the construction of the modulation section 50 and the demodulation section 52 of the ship modem 54, it being understood that this description applies also to the construction of the modulation section 56 and the demodulation section 58 of the shore modem 60. With reference to FIG. 7, there are shown the modulation section 50 and the demodulation section 52 of the ship modem 54. The modulation section 50 comprises the transmit buffer 62 connecting with the input terminal 102 as shown in FIG. 1, and the interleaver 66, also shown in FIG. 1. In FIG. 7, an FEC (forward error correction) encoder 1054 is shown in place of the turbo encoder 64 to emphasize that the invention may employ various ones of well-known FEC encoders as well as the FEC encoder 64. The pilot symbol insertion circuitry 68 of FIG. 1 is represented in FIG. 7 by the more detailed circuitry including two constellation mappers 1056 and 1058, a multiplexer 1060 and a memory 1062 storing a pilot word.

In the operation of the modulation section 50 of FIG. 7, an input signal of a user, applied to the input terminal 102, passes through the transmit buffer 62 to be encoded by the encoder 1054 with an error correction code, and the coded signal outputted from the encoder 1054 is applied via the mapper 1056 to the interleaver 66 to receive a modulation in the form of BPSK, QPSK, QAM, or FSK, by way of example. The bits of the coded signal are mapped by the mapper 1056 into I and Q components. By way of example, in BPSK, one bit generates one symbol. In QPSK, two bits generate one symbol (as represented by the I and the Q components). And in 8PSK, three bits generate one symbol. The modulated signal produced by the mapper 1056 is applied to the multiplexer 1060. The user input signal applied to the transmit buffer 102 may be digitized data, as is outputted by a computer, or digitized voice signals, by way of example.

A sequence of pilot symbols constituting a pilot word is stored in the memory 1062 and is outputted via the mapper 1058 to the multiplexer 1060. The mapper 1058 is operative in the same manner as the mapper 1056 to provide any of a plurality of modulations. A timing unit 1068 provides timing signals for synchronizing operations of the transmit buffer 62 with the memory 1062 and the multiplexer 1060, the timing signals including a data clock applied to the transmit buffer 62 and a frame timing applied to the multiplexer 1060. Other timing signals provided to other components of the modulation section are indicated by a T, and serve to synchronize the operations of the various components of the modulation section. The encoder 1054, the mapper 1056, the mapper 1058, and the pilot-word memory 1062 include respective terminals 1070, 1072, 1074 and 1076 by which, respectively, the encoder 1054 is enabled to select one of a plurality of codes, each of the mappers 1056 and 1058 are enabled to select one of a plurality of modulations, and the memory 1062 is enabled to output one of a plurality of previously stored pilot words. In the operation of the modulation section 50, the timing unit 1068 strobes alternately the transmit buffer 62 and the pilot word memory 1062 to output from the multiplexer 1060 the alternating sequence of data symbols and pilot symbols, shown in FIG. 3.

FIG. 7 also shows components of the modulator 70 of FIG. 1, these components including an up-conversion unit 1078 comprising a numerically controlled oscillator (NCO) 1080, a complex multiplier 1082, a digital-to-analog converter 1084, a filter 1086, and the transmit power amplifier 116 of FIG. 2. In FIG. 7, the up-conversion unit 1078 is operative to translate the signal outputted via the multiplexer 1060 up to an RF (radio frequency) signal to be outputted by the modulation section 50 of the modem 54. In the operation of the up-conversion unit 1078, the oscillator 1080 outputs a signal at a predesignated frequency to the multiplier 1082. The multiplier 1082 multiplies the in-phase and quadrature (I and Q) components of the symbols in the output of the multiplexer 1060 by the output signal of the oscillator 1080 to produce the digital equivalent of the RF output signal. The digitized signal at the output of the multiplier 1082 is then converted to an analog signal by the converter 1084, is filtered by the bandpass filter 1086, and is amplified by the transmit power amplifier 116 to produce a sinusoidal waveform with modulation corresponding to the modulation imparted by the constellation mappers 1056 and 1058, and with a carrier frequency corresponding to the frequency of the oscillator 1080.

In the demodulation section 52 of the modem 54, FIG. 7 shows the de-interleaver 84 and the receive buffer 90 of FIG. 1. Components of the demodulator 82 (FIG. 1) are shown in FIG. 7, and include a down-conversion subsystem 1088 with an analog-to-digital converter 1090 which, upon receipt of an input RF signal, converts the input RF signal from analog format to digital format. The down-conversion subsystem 1088 includes digital components, as will be described hereinafter, for outputting on line 1092 a baseband digital signal having the general form of the signal produced by the multiplexer 1060 and described in FIG. 3, wherein there are sequences of data symbols interleaved among sequences of pilot symbols.

The pilot symbol detection circuitry 86 of FIG. 1 is represented in FIG. 7 by the more detailed circuitry including a pilot symbol detector 1094, a memory 1096 for storing a reference pilot word to be used by the detector 1094 in the detection of pilot symbols in the signal on line 1092, and circuitry 1098 responsive to the presence of the pilot symbols for establishing a time base for use in extracting the data symbols from the signal on line 1092. Signals on line 1092 are fed via the de-interleaver 84 to an inverse mapper 1100. The inverse mapper 1100 operates upon the signals of line 1092 in a manner inverse to the operation of the mapper 1056 to demodulate the retrieved data symbols, A decoder 1102 is shown in place of the turbo decoder 88 (FIG. 1) to emphasize that the invention may employ various ones of well-known decoders as well as the turbo decoder 88. The decoder 1102 follows the de-interleaver 84, and operates in a manner inverse to the operation or the encoder 1054 for decoding the data symbols, and outputting the decoded signals to the receive buffer 90.

Thus, in the operation of the demodulation section 52, the detector 1094 is able to detect the presence of the pilot symbols on line 1092. The time base circuitry 1098 establishes a time base, based on the presence of the pilot symbols, for extraction of the data symbols from line 1092. The reference sequence of pilot symbols to be employed by the detector 1094 is to be the same as that employed in a distant modem communicating with the modem 54. By use of the time base, the inverse mapper 1100, the de-interleaver 84, and the decoder 1102 are able to demodulate and to decode the data symbols so as to recover the data and to output the data to the user of the modem.

FIG. 8 provides a more detailed description of the pilot symbol detector 1094 with the time base circuitry 1098, and of the decoder 1102, these components being part of the ship demodulation section 52 of FIG. 7. FIG. 8 also shows interconnections of these components with other components of the demodulation section 52, these interconnections being with the memory 1096 of the reference pilot symbols, the de-interleaver 84, inverse mapper 1100, the buffer 90, and the converter 1090 of the down-conversion sub-system 1088 of FIG. 7. This description applies also to the shore demodulation section 58 of FIG. 1.

The circuitry of FIG. 8 further comprises a down-conversion unit 1104, a filter 1106 for limiting the bandwidth of the signal and including a high amount of decimation of the signal samples, a matched filter 1108, an adjustable delay unit 1110, a phase error detector 1112, a loop filter 1114, and a numerically controlled oscillator 1116. An input signal at terminal 1118 (shown also in FIG. 7) is converted by the converter 1090 from an analog signal to a digital signal, and then is down-converted to baseband by the down-conversion unit 1104 upon a mixing of the signal with a reference signal from the oscillator 1116. Thereupon, the signal passes to the filter 1106 for removal of any spectral components lying outside of its desired bandwidth, as well as removal of a DC component. The filter 1106 includes variable decimation circuitry for deleting excess samples of the filtered signal. Thereupon, the signal is detected by the matched filter 1108. The precision in the operation of the matched filter 1108 is dependent on the alignment of the reference signal from the oscillator 1116 applied to the circuit 1104, the alignment being controlled by a loop 1120 consisting of the circuit 1104 and the oscillator 1116, along with the filter 1106, the filter 1108, the delay unit 1110, the detector 1112, and the loop filter 1114.

The loop 1120 is the carrier phase and frequency recovery loop. In the operation of the loop 1120, a synchronization generator 1122 outputs a signal for control of the delay of the delay unit 1110, and outputs a further signal which serves as a reference signal for operation of the phase error detector 1112. The delay of the unit 1110 is adjusted to provide for alignment of the signal outputted by the oscillator 1116 with the signal outputted by the converter 1090. The delayed signal, outputted by the delay unit 1110, is compared with the phase reference at the detector 1112 which outputs a signal to the loop filter 1114 indicating the error in phase or alignment of the two signals applied to the detector 1112. The loop filter 1114 applies the phase error to a control terminal of the oscillator 1116 to adjust the frequency and phase of its output signal. The loop filter 1114 operates in a well-known fashion to control the dynamic stability of the loop 1120.

The output signal of the delay unit 1110 is applied via an equalizer 1124 to the inverse mapper 1100 and to the synchronization generator 1122. The output signal of the inverse mapper 1100 is applied to the de-interleaver 84, as was shown in FIG. 7. In FIG. 8, the function of the equalizer 1124 is to remove distortion in the signals received by the matched filter 1108, this function being particularly useful in the case of received signals having the 16-QAM format. Upon receipt of the signal from the equalizer 1124, the synchronization generator 1122 is able to generate various timing signals, synchronized with the signal of the equalizer 1124, the timing signals being indicative of carrier phase, symbol timing and frame timing.

The demodulation section 52 further comprises a time error detector 1128, a further loop filter 1130 and a phase-locked loop (PLL) 1132. The signal outputted by the delay unit 1110 is applied, along with a timing reference signal from the generator 1122, as input signals to the detector 1128. The detector 1128 uses these two signals to compute a timing error, and outputs a signal via the loop filter 1130 to the PLL 1132 indicative of the time error between the signals of the delay unit 1110 and the generator 1122. The PLL 1132 outputs a periodic waveform, such as a sine wave or a square wave, that serves as a clock signal for operation of the analog-to-digital converter 1090. The detector 1128, the filter 1130 and the PLL 1132 are part of a further loop 1134 which functions as a timing synchronization loop. In the preferred embodiment of the invention, the pilot symbols have the same symbol rate as do the data symbols so that, upon a locking of the PLL 1132 to the input signal at terminal 1118, the strobing of the converter 1090 is operative equally for both the data symbols and the pilot symbols.

The synchronization generator 1122 is provided also with the pilot symbols reference, which may be provided by the pilot memory 1096 (also shown in FIG. 7), or may be stored within the synchronization generator 1122, by way of example. The synchronization generator 1122 employs the reference sequence of pilot symbols to detect the occurrences of the pilot symbol sequences in the composite signal of pilot symbol sequences interleaved with the data symbol sequences outputted by the equalizer 1124. This will be explained further with reference to FIG. 9. As shown in FIG. 8, the generator 1122 provides a timing signal to the mapper 1100 to perform the inverse function of the constellation mapping, and also to the de-interleaver 84 to perform the de-interleaving function, thereby to prepare the received signal for the following decoding process, as shown by the decoder 1102 of FIG. 7, and as will be described in greater detail with reference to the decoding equipment shown in FIG. 8.

In FIG. 8, the decoding equipment includes various decoding blocks that may be employed for decoding various formats which may be applied to the input signals received at terminal 1118. These blocks include a decoder 1136 having a section for turbo decoding and a decoding of TCM (trellis coded modulation) 16-QAM, a decoder 1138 employing a Viterbi algorithm for TCM 8-PSK, an inter-code de-interleaver 1140, a Reed-Solomon decoder 1142 outputting signals to the receive buffer 90, a user interface 1146 and a further PLL 1148. The signal outputted by the de-interleaver 84 may be applied to the detector 1136 to accomplish the turbo decoding or a decoding of TCM 16-QAM, the decoder output signals then being stored in the buffer 90. Alternatively, the signal of the de-interleaver 84 may be applied to the decoder 1138 and then via the inter-code de-interleaver 1140 to the Reed-Solomon decoder 1142 to accomplish the decoding operations of the decoders 1138 and 1142. The PLL 1148 is driven by a timing signal of the generator 1122 to output strobe signals to the interface 1146. The data stored in the buffer 90 is made available to a user by the interface 1146, wherein the interface 1146 may provide for additional formatting beneficial to the user. The signal outputted by the equalizer 1124 is applied also to circuitry 1150 providing for an estimate of distortion in the signal, and to circuitry 1152 which provides an estimate of signal pilot-to-noise power ratio on a per-symbol basis. This information is useful for a determination of the accuracy of the data being received by the demodulation section 52.

Also, it is noted that certain portions of the equipment can be fabricated in the form of an FPGA (Field Programmable Gated Array). Thus, all digital processing can be accomplished in the FPGA. The use of the FPGA is preferred in the construction of the invention because it enables one piece of equipment to be employed for handling any one of several possible formatting options. Alternatively, a DSP (Digital Signal Processor) may be employed for a reduced throughput speed but increased programming capability. An ASIC (Application Specific Integrated Circuit) may also be employed for maximum throughput speed in the situation wherein only a single format is anticipated, or also in any of a plurality of formats if the ASIC is constructed with the additional circuitry required for carrying forth the additional formats. In the cases of the FPGA and the DSP, optional coding and modulation may be provided for by including in memories of the FPGA and of the DSP instructions for the optional coding and modulation. By way of example, in FIG. 7, the encoder 1054, the two mappers 1056 and 1058, and the multiplexer 1060 may be fabricated as an FPGA wherein the FPGA includes a memory 1160 with instructions for implementing various forms of coding and modulation. Similarly, the filters, detectors and the decoders of FIG. 8 can be fabricated as an FPGA wherein a memory 1162 stores the programming for implementing various forms of demodulation and decoding. In the event that a DSP or an ASIC is employed, the memories 1160 and 1162 would store the instructions for the operations of the DSP or ASIC.

With reference to FIG. 9, there is shown a portion of the synchronization generator 1122 of FIG. 8, the portion including a correlator 1166, a timing unit 1168, and a tracking loop 1170. The tracking loop 1170 includes a gate 1172, a loop filter 1174, an oscillator 1176 and a counter 1178. The circuitry of FIG. 9 is provided by way of example to demonstrate a construction of the synchronization generator 1122 for utilization of the pilot symbol sequence to obtain an accurate time base for demodulating the received composite signal of interleaved sequences of data and pilot symbols. The received composite signal is correlated with the pilot reference sequence at the correlator 1166 to obtain an output signal, indicated in stylized fashion at 1180, wherein peaks 1182 provide an accurate indication of the times of the occurrences of the pilot symbol sequence in the received composite signal. The signal 1180 is applied to the gate 1172, wherein a gating signal is also applied to the gate 1172 by the counter 1178. At the gate 1172, the two signals applied to the gate are multiplied together to provide an error signal which is outputted via the loop filter 1174 to the oscillator 1176. The error signal drives the oscillator 1176 to provide its output signal with a phase and a frequency that minimizes the loop error signal. The loop filter 1174 provides dynamic stability to the loop 1170. The oscillator 1176 operates at relatively high frequency which is divided down by the counter 1178 to produce the gating signal for the gate 1172, the gating signal also been applied to the timing unit 1168. The timing unit 1168 is operative to provide a frame synchronization signal and a phase synchronization signal for use by the synchronization generator 1122.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method of maintaining communication of data in a communication link between a transmission site and a reception site during a momentary disruption of the communication link, the method comprising steps of:
    storing data in a memory at the transmission site during an interval of time that includes said disruption;
    transmitting said data as a set of data bits from said memory along said communication link at a point in time subsequent to said disruption; and
    combining said set of data bits at the reception site with a previously communicated sequence of data bits to provide continuity of the communication of the data.

2. A method according to claim 1, wherein said combining step includes a decoding of an error correction code present in said sequence of data bits.

3. A method according to claim 1, wherein said storing step stores a first sequence of data occurring over an interval of time longer than and including said disruption, and wherein said data is read out of said memory in a second sequence that is a scrambled version of said first sequence prior to send transmitting step.

4. A method according to claim 3, wherein said combining step includes a descrambling of said previously communicated sequence.

5. A method according to claim 4, wherein said combining step includes a decoding of an error correction code present in said sequence of data bits, said decoding step taking place after said descrambling step.

6. A method according to claim 4, wherein said first sequence of data is read into said memory by rows in a tabulation format of rows and columns, and is read out of said memory in columns to accomplish said descrambling, and wherein in said storing step, said interval of time is longer than said disruption by at least a factor of 10.

7. A method according to claim 1, wherein, in said storing step, said interval of time is equal to the length of said disruption, and data stored in said storing step is transmitted to said reception site after said disruption, said reception site including a buffer for received data, and wherein data from said combining step is outputted to a user prior to and during said disruption.

8. A method according to claim 7 wherein a clock rate for received data at the reception site is increased momentarily for receiving data in said buffer at said reception site to fill said buffer with data in preparation for a disruption.

9. A method according to claim 1, wherein, in said storing step, said interval of time is equal to the length of said disruption, and data stored in said storing step is transmitted to said reception site after said disruption, said reception site including a buffer for received data, and wherein there is a step of filling said buffer with received data prior to the occurrence of said disruption, and said combining step includes a step of reading out data from said buffer during said disruption to provide for a continuous flow of data to a user at said reception site.

10. A method according to claim 9 wherein a clock rate for receiving data at the reception site from the transmission site is increased momentarily for filling the buffer with data prior to the occurrence of said disruption.

11. A method according to claim 10 wherein, during said momentary increase of clock rate, there is a reduction in the amount of data stored in said memory at said transmission site, thereby to empty said memory in preparation for a storing of data therein during a subsequent disruption.

12. A system for maintaining communication of data in a communication link between a transmission site and a reception site during a momentary disruption of the communication link, the system comprising:
    a memory at the transmission site serving for the storage of data during an interval of time that includes said disruption;
    a transmitter for transmitting said data as a set of data bits from said memory along said communication link at a point in time subsequent to said disruption; and
    circuitry for combining said set of data bits at the reception site with a previously communicated sequence of data bits to provide continuity of the communication of the data.

13. A system according to claim 12, further comprising a decoder providing a decoding of an error correction code present at the output of said combing circuitry in said sequence of data bits.

14. A system according to claim 12, wherein said memory stores a first sequence of data occurring over an interval of time longer than and including said disruption, and wherein said data is read out of said memory in a second sequence that is a scrambled version of said first sequence prior to transmission to said reception site.

15. A system according to claim 14, wherein said memory is part of an interleaver at said transmission site for scrambling said first sequence, and the system further comprises a de-interleaver following said combining circuitry at said reception site for descrambling of a previously communicated sequence.

16. A system according to claim 15, further comprising a decoder at said reception site for a decoding of an error correction code present in said sequence of data bits, said decoding step taking place after said descrambling.

17. A system according to claim 15, wherein said first sequence of data is read into said interleaver by rows in a tabulation format of rows and columns, and is read out of said interleaver in columns to accomplish said descrambling, and wherein said interval of time is longer than said disruption by at least a factor of 10.

18. A system according to claim 12, wherein said interval of time is equal to the length of said disruption, and data stored in said memory is transmitted to said reception site after said disruption, said reception site including a buffer for received data, and wherein data communicated along said link is outputted to a user prior to and during said disruption and during said subsequent disruption.

19. A system according to claim 18 wherein a clock rate for received data at the reception site is increased momentarily for receiving data in said buffer at said reception site to fill said buffer with data in preparation for a disruption.

20. A system according to claim 12, wherein said interval of time is equal to the length of said disruption, and data stored in said memory is transmitted to said reception site after said disruption, said reception site including a buffer for received data, and wherein there is a filling of said buffer with received data prior to the occurrence of said disruption, and there is a reading out of data from said buffer during said disruption to provide for a continuous flow of data to a user at said reception site.

21. A system according to claim 20 wherein a clock rate for receiving data at the reception site from the transmission site is increased momentarily for filling the buffer with data prior to the occurrence of said disruption.

22. A system according to claim 21 wherein, during said momentary increase of clock rate, there is a reduction in the amount of data stored in said memory at said transmission site, thereby to empty said memory in preparation for a storing of data therein during a subsequent disruption.

* * * * *